(12) United States Patent
Hu et al.

(10) Patent No.: US 12,020,653 B2
(45) Date of Patent: Jun. 25, 2024

(54) DISPLAY PANEL AND DRIVING METHOD THEREOF

(71) Applicant: TCL CHINA STAR OPTOELECTRONICS TECHNOLOGY CO., LTD., Guangdong (CN)

(72) Inventors: Xiong Hu, Guangdong (CN); Yu Wu, Guangdong (CN); Xiaolong Chen, Guangdong (CN); Tao He, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/623,762

(22) PCT Filed: Dec. 27, 2021

(86) PCT No.: PCT/CN2021/141533
§ 371 (c)(1),
(2) Date: Jun. 22, 2023

(87) PCT Pub. No.: WO2023/108808
PCT Pub. Date: Jun. 22, 2023

(65) Prior Publication Data
US 2024/0119908 A1    Apr. 11, 2024

(30) Foreign Application Priority Data
Dec. 14, 2021 (CN) .......................... 202111532101.X

(51) Int. Cl.
G09G 3/34       (2006.01)
G02F 1/13357    (2006.01)
(Continued)

(52) U.S. Cl.
CPC ..... *G09G 3/3406* (2013.01); *G02F 1/133602* (2013.01); *G09G 3/342* (2013.01);
(Continued)

(58) Field of Classification Search
CPC ...... G09G 3/3406; G09G 3/3648; G09G 3/36; G09G 5/18; G09G 2320/062;
(Continued)

(56) References Cited

U.S. PATENT DOCUMENTS 6,654,065 B1    11/2003 Sung
10,692,443 B2 *  6/2020 Wu .......................... H03K 7/08
(Continued)

FOREIGN PATENT DOCUMENTS

CN    101083050 A    12/2007
CN    105575341 A     5/2016
(Continued)

OTHER PUBLICATIONS

International Search Report in International application No. PCT/CN2021/141533, dated Aug. 25, 2022.
(Continued)

*Primary Examiner* — Dismery Mercedes
(74) *Attorney, Agent, or Firm* — PV IP PC; Wei Te Chung; Zhigang Ma

(57) ABSTRACT

A display panel and a driving method thereof are provided. The driving method includes: acquiring a display synchronization signal, and according to it to determine a first backlight synchronization signal including a plurality of second pulses corresponding to a plurality of first pulses in the display synchronization signal; acquiring a display setting frequency greater than a minimum value of refresh rates of frame images, and according to it to determine a unit backlight clock signal, where a duration of the unit backlight clock signal is equal to of a reciprocal of the display setting
(Continued)

frequency; and generating a third pulse between some two adjacent second pulses to drive a backlight plate to emit light.

20 Claims, 3 Drawing Sheets

(51) Int. Cl.
*G09G 3/36* (2006.01)
*G09G 5/18* (2006.01)

(52) U.S. Cl.
CPC ............... *G09G 3/36* (2013.01); *G09G 5/18* (2013.01); *G09G 2310/08* (2013.01); *G09G 2320/0626* (2013.01); *G09G 2320/0646* (2013.01); *G09G 2340/0435* (2013.01)

(58) Field of Classification Search
CPC ... G09G 2320/0233; G09G 2320/0626; G09G 2380/16; G09G 2310/0237; G09G 2310/0243; G09G 2340/0435; G09G 2320/0646; G09G 2310/08; G09G 3/34; G06F 3/04184; G06F 3/0416; G02F 1/133602; G02F 1/1336
See application file for complete search history.

(56) References Cited

U.S. PATENT DOCUMENTS

| | | | |
|---|---|---|---|
| 10,796,644 B2* | 10/2020 | Du | G09G 5/12 |
| 10,991,321 B1* | 4/2021 | Chen | G09G 3/3426 |
| 11,443,704 B1* | 9/2022 | Chiang | G09G 3/3426 |
| 11,715,431 B2* | 8/2023 | Xiao | G09G 3/2037 |
| | | | 345/691 |
| 2012/0306941 A1* | 12/2012 | Chang | G09G 3/3406 |
| | | | 345/690 |
| 2014/0184485 A1* | 7/2014 | Kim | G09G 3/3406 |
| | | | 345/102 |
| 2017/0110066 A1* | 4/2017 | Luo | G09G 3/3406 |
| 2021/0210037 A1* | 7/2021 | Chen | G09G 3/3406 |

FOREIGN PATENT DOCUMENTS

| | | |
|---|---|---|
| CN | 112992028 A | 6/2021 |
| JP | 2006338050 A | 12/2006 |
| TW | I237794 B | 8/2005 |

OTHER PUBLICATIONS

Written Opinion of the International Searching Authority in International application No. PCT/CN2021/141533, dated Aug. 25, 2022.

* cited by examiner acquiring a display synchronization signal and a display setting frequency of the display panel, wherein the display synchronization signal comprises a plurality of first pulses, each of the first pulses is configured to trigger a display of a corresponding frame image, and the display setting frequency is at least greater than a minimum value of refresh rates of a plurality of frame images in the display panel ~ S1 determining a first backlight synchronization signal of a backlight plate in the display panel according to the display synchronization signal, wherein the first backlight synchronization signal comprises a plurality of second pulses, the plurality of second pulses correspond to the plurality of first pulses in a one-to-one correspondence; and determining a unit backlight clock signal of the backlight plate in the display panel according to the display setting frequency, wherein a duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal ~ S2 generating at least one third pulse between some two adjacent second pulses in the first backlight synchronization signal, so that the first backlight synchronization signal is converted into a second backlight synchronization signal; and triggering a generation of one of the unit backlight clock signals by each of the second pulses, and triggering a generation of one of the unit backlight clock signals by each of the third pulses ~ S3

FIG. 1

DISPLAY PANEL AND DRIVING METHOD THEREOF

FIELD OF DISCLOSURE

The present disclosure relates to the field of display technologies, in particular to the field of display panel manufacturing technologies, in particular to a display panel and a driving method thereof.

BACKGROUND

With the popularity of liquid crystal display (LCD) panels, variable frame rate (VRR) technology applications that are used to achieve a refresh rate of a display image and match the refresh rate of the display came into being.

The display image of the LCD panel comes from a light source provided by a backlight plate. Currently, a backlight synchronization signal with a same frequency as a display synchronization signal is used to control a backlight clock signal. Also, a refresh frequency of a normal display clock signal is used as a fixed frequency of the backlight clock signal to drive the backlight source to provide a required light source to the LCD. However, the applicant found that in a FreeSync technology, the refresh frequency of different frame images is different. That is, the refresh frequency of the backlight clock signal will be greater than a refresh frequency of a real-time image, which will cause the light source to be turned off in advance and cause a dark state, which reduces a quality of the display image of the LCD panel.

Therefore, the quality of the display image of the existing LCD panel adopting the FreeSync technology is low and it needs to be improved.

SUMMARY OF DISCLOSURE

Embodiments of the present disclosure provide a display panel and a driving method thereof to solve a problem that a refresh rate of an existing backlight clock signal does not match a refresh rate of a real-time image, which causes a light source to be turned off in advance and cause a dark state, which reduces a quality of a display image of an LCD panel.

An embodiment of the present disclosure provides a driving method of the display panel, including:

acquiring a display synchronization signal and a display setting frequency of the display panel, wherein the display synchronization signal includes a plurality of first pulses, each of the first pulses is configured to trigger a display of a corresponding frame image, and the display setting frequency is at least greater than a minimum value of refresh rates of a plurality of frame images in the display panel;

determining a first backlight synchronization signal of a backlight plate in the display panel according to the display synchronization signal, wherein the first backlight synchronization signal includes a plurality of second pulses, the plurality of second pulses correspond to the plurality of first pulses in a one-to-one correspondence; and determining a unit backlight clock signal of the backlight plate in the display panel according to the display setting frequency, wherein a duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal; and generating at least one third pulse between some two adjacent second pulses in the first backlight synchronization signal, so that the first backlight synchronization signal is converted into a second backlight synchronization signal; and triggering a generation of one of the unit backlight clock signals by each of the second pulses, and triggering a generation of one of the unit backlight clock signals by each of the third pulses.

The present disclosure provides a display panel and a driving method thereof. The driving method of the display panel includes: acquiring a display synchronization signal and a display setting frequency of the display panel, wherein the display synchronization signal includes a plurality of first pulses, each of the first pulses is configured to trigger a display of a corresponding frame image, and the display setting frequency is at least greater than a minimum value of refresh rates of a plurality of frame images in the display panel; determining a first backlight synchronization signal of a backlight plate in the display panel according to the display synchronization signal, wherein the first backlight synchronization signal includes a plurality of second pulses, the plurality of second pulses correspond to the plurality of first pulses in a one-to-one correspondence; and determining a unit backlight clock signal of the backlight plate in the display panel according to the display setting frequency, wherein a duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal; and generating at least one third pulse between some two adjacent second pulses in the first backlight synchronization signal, so that the first backlight synchronization signal is converted into a second backlight synchronization signal; and triggering a generation of one of the unit backlight clock signals by each of the second pulses, and triggering a generation of one of the unit backlight clock signals by each of the third pulses. In this solution, at least one third pulse is generated between some two adjacent second pulses in the first backlight synchronization signal to form the second backlight synchronization signal, such that after a frame image with a smaller refresh rate exceeds a time of an image refreshed with the display setting frequency, it can still be generated by triggering at least one corresponding unit backlight clock signal by at least one of the third pulses in the second backlight synchronization signal, so as to drive the backlight plate to still emit light. It prevents the backlight plate from turning off in advance during a process of presenting the frame image with the smaller refresh rate, thereby preventing the dark state and improving a quality of a display image of an LCD panel.

BRIEF DESCRIPTION OF DRAWINGS

The present disclosure will be further illustrated by the following drawings. It should be noted that the drawings in the following description are only used to explain some embodiments of the present disclosure. For those skilled in the art, without creative efforts, other drawings can be obtained based on these drawings.

FIG. 1 is a flowchart of a driving method of a display panel of an embodiment of the present disclosure.

DETAILED DESCRIPTION

Figure 2:
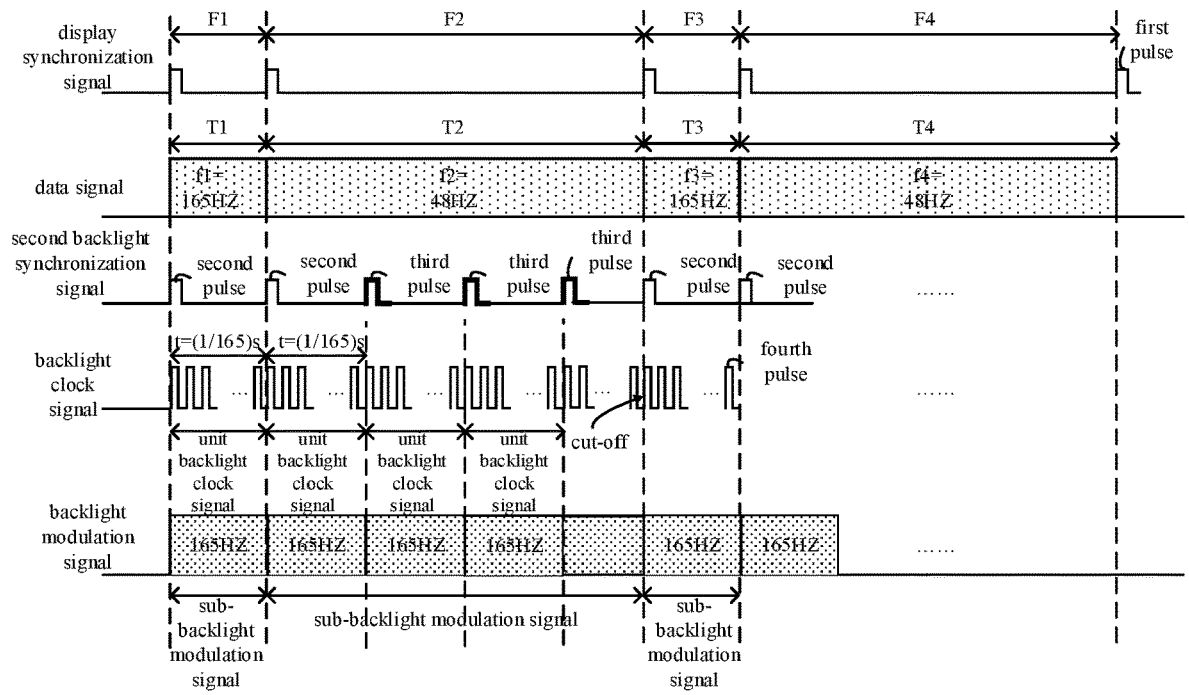
FIG. 2 is a waveform diagram of a part of signals related to a driving method of a display panel of an embodiment of the present disclosure.

Technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within the scope of protection of the present disclosure.

Terms "first", "second", "third", etc. in the present disclosure are used to distinguish different objects, rather than to describe a specific order. In addition, terms "including" and "having" and any variations thereof are intended to cover non-exclusive inclusions. For example, a process, method, system, product, or device that includes a series of steps or modules is not limited to the listed steps or modules, but alternatively includes unlisted steps or modules, or alternatively include other steps or modules inherent to this process, method, product, or equipment.

A term "embodiment" mentioned herein means that specific features, structures, or characteristics described in conjunction with the embodiment may be included in at least one embodiment of the present disclosure. The appearance of the term in each paragraph in the specification does not necessarily refer to the same embodiment, nor is it an independent or alternative embodiment mutually exclusive with other embodiments. Those skilled in the art clearly and implicitly understand that the embodiments described herein can be combined with other embodiments.

An embodiment of the present disclosure provides a driving method of a display panel, and the driving method of the display panel includes but is not limited to following embodiments and a combination of the following embodiments.

In an embodiment, as shown in FIG. 1, a driving method of a display panel includes but is not limited to following steps.

S1, a display synchronization signal and a display setting frequency of the display panel are acquired. The display setting frequency is at least greater than a minimum value of refresh rates of a plurality of frame images in the display panel. The display synchronization signal includes a plurality of first pulses, each of the first pulses is configured to trigger a display of a corresponding frame image.

The display panel can be, but is not limited to, a liquid crystal panel as long as the display panel can be combined with a switch device to control an amount of light that is allowed to be emitted through a backlight plate at each sub-pixel to present a corresponding brightness, so as to realize the brightness display at multiple sub-pixels for displaying images. A plurality of signals in the present disclosure can be understood as signals loaded on any sub-pixel or on the backlight corresponding to the sub-pixel.

In the process of displaying images, it can be divided into a plurality of frame images, and a refresh rate of each frame image can be the same or different from a refresh rate of a previous frame image.

Specifically, as shown in FIG. 2, the display synchronization signal in this embodiment includes a plurality of first pulses. Each first pulse is used to trigger a display of a corresponding frame image. Furthermore, the specific presentation manner of each frame image can be understood as that after each first pulse in the display synchronization signal, a corresponding frame image is displayed with a corresponding refresh rate. A definition of the refresh rate is a number of frames displayed per second. That is, it can be understood here that a duration required for displaying each frame image is a reciprocal of the corresponding refresh rate. That is, for a frame image with a smaller refresh rate compared to a frame image with a larger refresh rate, since the number of frames that can be presented in each second is small, the duration required for displaying the frame image with the smaller refresh rate is longer, the duration required for displaying the frame image with the larger refresh rate is shorter.

Figure 3:
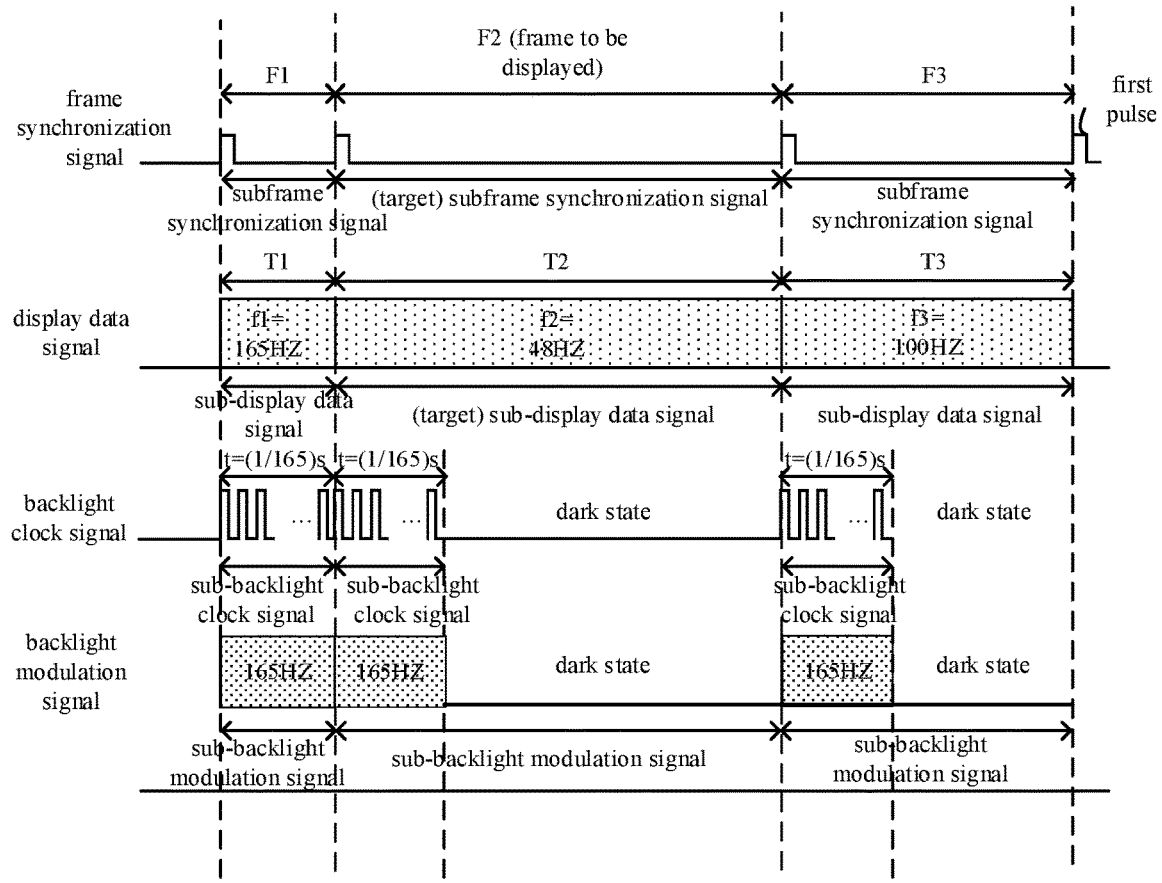
FIG. 3 is a waveform diagram of a part of signals related to a driving method of a display panel in the prior art.

For example, as shown in FIG. 3, here, a refresh rate f1 of a first frame image F1, a refresh rate f2 of a second frame image, a refresh rate f3 of a third frame image, and a refresh rate f4 of a fourth frame image are respectively 165 HZ, 48 HZ, 165 HZ, 48 HZ for illustration. A duration T1 required for displaying the first frame image, a duration T2 required for displaying the second frame image, a duration T3 required for displaying the third frame image, and a duration T4 required for displaying the fourth frame image are respectively ($1/165$)s, ($1/48$)s, ($1/165$)s, ($1/48$)s. T2 is greater than T1, and T4 is greater than T3. If a constant frequency is used to drive the backlight plate to emit light in each frame image, an example is described here by switching the first frame image F1 to the second frame image F2 and the constant frequency is greater than 48 HZ. A definition of the frequency here can refer to the definition of the refresh rate above. The higher the frequency, the shorter the duration of driving the backlight plate to emit light once. Since the duration of a light emission of the backlight plate driven by the constant frequency is shorter than ($1/48$) s, which is smaller than the duration T2 required for completely displaying the second frame image F2, it is not sufficient to support the full duration of the display of the second frame image F2. That is, an image displayed in a later period of the second frame image F2 will show in a dark state. On the contrary, when the constant frequency is less than 48 HZ, the duration of a light emission of the backlight plate driven by the constant frequency is greater than ($1/48$)s, which will cause the backlight duration corresponding to the second frame image F2 to extend to the third frame image F3. As a result, the third frame image F3 cannot accurately match the corresponding backlight, resulting in loss or even loss of the third frame image F3.

S2, a first backlight synchronization signal of a backlight plate in the display panel is determined according to the display synchronization signal. The first backlight synchronization signal includes a plurality of second pulses, the plurality of second pulses correspond to the plurality of first pulses in a one-to-one correspondence. A unit backlight clock signal of the backlight plate in the display panel is determined according to the display setting frequency. A duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal.

According to the above-mentioned, the reciprocal of the display setting frequency is the duration required for displaying the corresponding frame image. The plurality of second pulses in the first backlight synchronization signal correspond to the plurality of first pulses in the display synchronization signal in the one-to-one correspondence. Every time one first pulse is generated, one second pulse is also generated. Specifically, as shown in FIG. 2, here it can be understood that the duration of the unit backlight clock signal is equal to the duration required for displaying the frame image with the display setting frequency as a frequency. It should be noted that in the duration of the unit backlight clock signal, it can be considered that the backlight plate continues to emit light or emits light according to a certain rule. In combined with the discussion in the step S1, the display setting frequency is at least greater than the minimum value of the refresh rates of the plurality of frame images in the display panel. Also, in this embodiment, each of the first pulses triggers the display of a corresponding frame image, and the corresponding second pulses triggers the generation of the unit backlight clock signal to drive the backlight plate to emit light. That is, there is at least a duration required to display the frame image with the smallest refresh rate being greater than the duration of the unit backlight clock signal. The unit backlight clock signal triggered by the second pulse corresponding to the first pulse is insufficient to maintain the frame image with the smallest refresh rate to present a completely bright image, and in a later stage of the frame image, it will appear as a dark state image.

Specifically, as shown in FIG. 2, the display setting frequency is 165 HZ as an example for illustration. That is, a duration of each unit backlight clock signal is equal to ($\frac{1}{165}$)s. Furthermore, this embodiment does not further limit a waveform of the unit backlight clock signal, for example, a number and an amplitude of pulses within ($\frac{1}{165}$)s may not be limited. Similarly, this embodiment does not further limit whether waveforms of the first backlight synchronization signal and the display synchronization signal are the same. For example, an amplitude of the second pulses in a first backlight signal may be the same or different from an amplitude of the first pulses in a display synchronization signal. Furthermore, other pulses or waveforms may also exist between two adjacent second pulses in the first backlight signal.

S3, at least one third pulse is generated between some two adjacent second pulses in the first backlight synchronization signal, so that the first backlight synchronization signal is converted into a second backlight synchronization signal. Each of the second pulses triggers a generation of one of the unit backlight clock signals, and each of the third pulses triggers a generation of one of the unit backlight clock signals.

In this embodiment, a specific method of generating the at least one third pulse between some two adjacent second pulses in the first backlight synchronization signal according to the display setting frequency is not limited. It is intended to emphasize that, compared with the first backlight synchronization signal, the second backlight synchronization signal includes at least one third pulse between some two adjacent second pulses. Specifically, as shown in FIG. 2, combined with the above discussion, the plurality of frame images are sequentially displayed under the trigger of the plurality of first pulses in the display synchronization signal. Correspondingly, the plurality of unit backlight clock signals are sequentially generated under the trigger of the plurality of second pulses in the first backlight synchronization signal to drive the backlight plate to emit light.

It should be noted that, as shown in FIG. 3, here, a refresh rate f1 of a first frame image F1, a refresh rate f2 of a second frame image, and a refresh rate f3 of a third frame image are respectively 165 HZ, 48 HZ, and 100 HZ for illustration. A duration T1 required for displaying the first frame image, a duration T2 required for displaying the second frame image, a duration T3 required for displaying the third frame image, and a duration T4 required for displaying the fourth frame image are respectively ($\frac{1}{165}$)s, ($\frac{1}{48}$)s, and ($\frac{1}{100}$)s. T2 is greater than T1, and T3 is greater than T2. If the refresh rate f1 is used to drive the backlight plate to emit light in the first frame image F1, the first frame image F1 is switched to the second frame image F2 and the refresh rate f1 is still used to drive the backlight plate to emit light as an example. Since the duration of a light emission of the backlight plate driven by the refresh rate f1 is shorter than ($\frac{1}{48}$)s, which is smaller than the duration T2 required for displaying the second frame image F2, it is not sufficient to support the full duration of the display of the second frame image F2. That is, an image displayed in a later period of the second frame image F2 will show in a dark state. Similarly, if the second frame image F2 is switched to the third frame image F3 and the refresh rate f1 is still used to drive the backlight plate to emit light, since the duration of the light emission of the backlight plate driven by the refresh rate f1 is shorter than ($\frac{1}{100}$)s, which is smaller than the duration T3 required for displaying the third frame image F3, it is not sufficient to support the full duration of the display of the third frame image F3. That is, an image displayed in a later period of the third frame image F3 will show in the dark state.

It is understandable that, refer to FIG. 2, in this embodiment, at least one third pulse is generated between some two adjacent second pulses to trigger the generation of the unit backlight clock signal to drive the backlight plate to emit light. It is equivalent to increasing a number of pulses used to trigger the unit backlight clock signal, thereby extending the duration of the light emission of the backlight plate in a corresponding frame image. It can at least prevent the extension of the duration of the light emission of the backlight plate in a frame image with a refresh rate less than the display setting frequency, so as to drive the frame image to present a complete bright, and improve the quality of the display image of the display panel. Furthermore, each sub-pixel in the display panel can adopt the driving method of the display panel in the present disclosure. Thus, each sub-pixel is driven to present a complete bright in at least one frame image, so as to improve the dark state problem of multiple sub-pixels, and further improve the quality of the display image of the display panel.

In an embodiment, the step S3 may include but is not limited to following steps.

S301, a refresh rate of a frame image to be displayed of the display panel is acquired, and it is determined whether the refresh rate of the frame image to be displayed of the display panel is less than the display setting frequency.

In this embodiment, by comparing a size relationship between the refresh rate of the frame image to be displayed and the display setting frequency, a size relationship between the duration required for the display of the frame image to be displayed and the duration of the unit backlight clock signal can be determined. Thus, it is determined whether the unit backlight clock signal is sufficient to maintain the frame image to be displayed for complete bright display.

S302, if the refresh rate of the frame image to be displayed is less than the display setting frequency, from one of the second pulses corresponding to the frame image to be displayed in the first backlight synchronization signal, the third pulse is generated every interval of the display setting period until one of the second pulses corresponding to a next frame image in the first backlight synchronization signal is generated. The display setting period is the reciprocal of the display setting frequency.

Specifically, in combination with the above discussion, each first pulse is used to trigger a corresponding frame image for display. The corresponding second pulse is also used to trigger the generation of the unit backlight clock signal to drive the backlight plate to emit light, so as to provide light for the frame image for bright display. It should be noted that, according to the above discussion, the refresh rate of the frame image to be displayed is less than the display setting frequency, which means that one unit backlight clock signal is not sufficient to maintain the frame image to be displayed for a complete bright display.

It is understandable that this embodiment further discloses that when the refresh rate of the frame image to be displayed is less than the display setting frequency, on a basis of the second backlight synchronization signal, after the corresponding second pulses, the third pulse is triggered and generated to increase the number of times the triggered and generated unit backlight clock signal to extend a time for driving the backlight plate to emit light. Moreover, the specific method of generating at least one third pulse is further limited. It is limited to be generated from the corresponding second pulse, and the third pulse is generated every interval of the display setting period. In combination with the above discussion, it can be seen that the duration of each unit backlight clock signal is also equal to the display setting period. That is, in this embodiment, when each unit backlight clock signal ends, by setting the third pulse, the unit backlight clock signal can be triggered and generate again to drive the backlight plate to emit light until the second pulse corresponding to the next frame image in the first backlight synchronization signal. That is, in this embodiment, it can at least improve the problem of insufficient the duration of the light emission of the backlight plate driven by the unit backlight clock signal corresponding to the second pulse in at least one frame image with the refresh rate less than the display setting frequency, extend the duration of the light emission of the backlight plate, and improve the quality of the display image of the display panel.

It should be noted that, combined with the above discussion, the plurality of second pulses can be generated before the plurality of third pulses. That is, "until one of the second pulses corresponding to the next frame image in the first backlight synchronization signal is generated" can be understood as a last corresponding third pulse in the frame to be displayed may be formed before the second pulse of the next frame image generated in advance. That is, the second pulse of the next frame image impose related restrictions on a generation time of the corresponding last third pulse in the frame to be displayed, and it is not limited to the second pulse of the next frame image being generated after the corresponding last third pulse in the frame to be displayed.

Specifically, as shown in FIG. 2, the display setting frequency is equal to 165 HZ and the frame image to be displayed is the second frame image F2 as an example for illustration. Since the refresh rate of the second frame image F2 is 48 HZ, a time for displaying the second frame image F2 is 3.44 times a time for displaying a frame image whose frequency is equal to the display setting frequency. That is, three third pulses will be generated after the second pulse corresponding to the second frame image F2, and a time interval between two adjacent third pulses is ($1/165$)s.

In one embodiment, the display setting frequency is greater than or equal to the refresh rate of any frame image in the display panel. Specifically, in combination with the above discussion, when the display setting frequency is at least greater than the minimum value of the refresh rates of the plurality of frame images in the display panel, at least one frame image with a refresh rate less than the display setting frequency can be improved by the third pulse. It is understandable that in this embodiment, the display setting frequency is further limited to a maximum value of refresh rates of the plurality of frame images. That is, when switching to any frame image, there are two situations as follows. The first is to switch to a frame image with a refresh rate less than the display setting frequency. At this time, reference may be made to the related description of the step S302. The second is to switch to a frame image with a refresh rate is equal to the display setting frequency. At this time, one unit backlight clock signal triggered by the corresponding second pulse drives the backlight plate to emit light with a duration sufficient to maintain the frame image for complete bright display. In summary, this embodiment can realize that for switching to any frame image, the dark state can be avoided in a later period of time, and further improve the quality of the display image of the display panel.

In an embodiment, the step S302 may include but is not limited to the following steps.

S3021, a first to-be-measured interval between a current third pulse generated after an interval of the display setting period and the second pulse corresponding to the next frame image in the first backlight synchronization signal is acquired.

Specifically, as shown in FIG. 2, the display setting frequency is 165 HZ, the display setting period is ($1/165$)s, and it is switched to the second frame image F2 as an example for description. Every time one third pulse is generated, it is necessary to acquire the first to-be-measured interval between the current third pulse and the second pulse corresponding to the next frame image in the first backlight synchronization signal.

S3022, if the first to-be-measured interval is less than the display setting period, the unit backlight clock signal corresponding to the current third pulse generated after the interval of the display setting period is cut off when or before the second pulse corresponding to the next frame image in the first backlight synchronization signal is generated.

It should be noted that, refer to FIG. 3, if the refresh rate f2 is used to drive the backlight plate to emit light in the first frame image F2, the second frame image F2 is switched to the third frame imageF3 and the refresh rate f2 is still used to drive the backlight plate to emit light as an example (not shown in FIG. 3). Since the refresh rate f2 is used to drive the backlight plate to emit light with a duration greater than ($1/48$)s, the duration of the backlight corresponding to the second frame image F2 will extend to the third frame image F3, resulting in that the third frame image F3 cannot accurately match the corresponding backlight, and resulting in loss or even loss of the third frame image F3.

Specifically, as shown in FIG. 2, in the second frame image F2, the first to-be-measured intervals between the first two generated third pulses and the second pulse corresponding to the next frame image in the first backlight synchronization signal are greater than display setting period. That is, a step S3032 can be omitted, and two unit backlight signals corresponding to the first two third pulses can be generated to drive the backlight plate to emit light, and a next third pulse is continuously generated. It should be noted that after the next third pulse is generated (i.e., after the third third pulse is generated), the first to-be-measured interval at this time is less than the display setting period. That is, if the corresponding unit backlight clock signal continues to be complete, it will occupy a backlight time of the third frame image F3. Therefore, in this embodiment, the unit backlight clock signal corresponding to the third pulse corresponding to the first to-be-measured interval less than the display setting period is cut off when or before the second pulse corresponding to the next frame image in the first backlight synchronization signal is generated. Under a premise that the backlight plate is driven to emit light by at least one unit backlight clock signal to improve the dark state problem, the backlight time of the third frame image F3 can be prevented from being occupied. It prevents the third frame image F3 from being unable to accurately match the corresponding backlight, reduces a risk of loss or even loss of the third frame image F3, and improves the quality of the display image of the display panel.

It should be noted that, combined with the above discussion, it can be seen that the plurality of second pulses can be generated before the plurality of third pulses. Each unit backlight clock signal is driven by the corresponding third pulse. That is, "the unit backlight clock signal corresponding to the current third pulse generated after the interval of the display setting period is cut off when or before the second pulse corresponding to the next frame image in the first backlight synchronization signal is generated" in this embodiment can be understood that the unit backlight clock signal driven and generated by a last third pulse can be formed before a second pulse of a pre-generated next frame image. That is, the second pulse of the next frame image make relevant restrictions on a cut off time of the unit backlight clock signal generated by the corresponding last third pulse in the display frame. The second pulse of the next frame image is not limited to generated after the cut off time of the unit backlight clock signal generated by the last third pulse in the frame to be displayed.

In an embodiment, the step S302 may include but is not limited to following steps.

S3023, a second to-be-measured interval between one of the second pulses corresponding to the frame image to be displayed and one of the second pulses corresponding to the next frame image is acquired.

The second to-be-measured interval is a time interval between the second pulse corresponding to the frame image to be displayed and the second pulse corresponding to the next frame image. The second to-be-measured interval can be understood as a reciprocal of a refresh frequency of the frame image to be displayed. With reference to FIG. 2, here, the frame to be displayed is the second frame image F2 and the next frame image is the third frame image F3 as an example for description, that is, the second to-be-measured interval is equal to (1/48)s.

S3024, a corresponding number of the third pulses are generated according to the second to-be-measured interval. The unit backlight clock signal corresponding to the third pulse closest to the second pulse of the next frame image is cut off when or before the second pulse corresponding to the next frame image in the first backlight synchronization signal is generated.

It is understandable that, in combination with the above discussion such as "from one of the second pulses corresponding to the frame image to be displayed in the first backlight synchronization signal, the third pulse is generated every interval of the display setting period until one of the second pulses corresponding to the next frame image in the first backlight synchronization signal is generated", it can be known that the number of the third pulses can be understood as a quotient corresponding to the second to-be-measured interval as a dividend and the display setting period as a divisor. Specifically, in this embodiment, the number of one-to-one correspondence of multiple third pulses and multiple second to-be-measured intervals may be stored in advance. Alternatively, the number of real-time third pulses can be calculated according to the display setting period and a real-time second to-be-measured interval. Combined with the limitation of "from one of the second pulses corresponding to the frame image to be displayed in the first backlight synchronization signal, the third pulse is generated every interval of the display setting period", it can automatically comply with "the last third pulse until the second pulse corresponding to the next frame image in the first backlight synchronization signal is generated", to generate corresponding multiple unit backlight clock signals. The corresponding multiple third pulses and multiple corresponding unit backlight clock signals are not generated by acquiring and determining whether each first to-be-measured interval is less than the display setting period in the previous embodiment.

In an embodiment, the step S3 may include but is not limited to following steps.

S303, the generation of a plurality of the unit backlight clock signals is triggered to form a backlight clock signal according to at least one of the second pulses and at least one of the second pulses in the second backlight synchronization signal. A backlight duty cycle of each frame image is acquired.

It is understandable that, refer to FIG. 2, when the second backlight synchronization signal is determined, a time position and number of the second pulses and the second pulses are also determined. In combination with "each of the second pulses triggers the generation of one of the unit backlight clock signals, and each of the third pulses triggers the generation of one of the unit backlight clock signals", it can be seen that multiple corresponding unit backlight clock signals can be further determined, to determine the backlight clock signal. Furthermore, the backlight duty cycle of each frame image can be understood as a proportion of the corresponding backlight emission time in the unit backlight time within each frame image. It can be understood that the larger the backlight duty cycle, the greater the brightness required for a corresponding frame image, and the greater the brightness finally presented. This dimming method is different from a conventional PWM dimming method. The difference is in a PWM dimming method of the present disclosure, corresponding to the third pulse, a corresponding driving the light emission of the backlight plate is also carried out.

S304, a backlight modulation signal is generated according to the backlight clock signal and a plurality of the backlight duty cycles, and the backlight plate is driven to emit light in the plurality of frame images by the backlight modulation signal.

Specifically, as shown in FIG. 2, based on the backlight clock signal and the plurality of backlight duty cycles, the backlight duty cycle of each frame image can be combined with at least one unit backlight clock signal corresponding to the frame, a sub-backlight modulation signal required for each frame image is generated. A plurality of sub-backlight modulation signals of the plurality of frame images are combined form a backlight modulation signal. Finally, the backlight is driven to emit light in the plurality of frame image through the backlight modulation signal. In this embodiment, a waveform of the backlight clock signal is not limited. In combination with the above discussion, the backlight plate can be considered to emit light continuously or according to a certain rule as long as the duration of the unit backlight clock signal is satisfied. Specifically, it can be achieved by reasonably setting the waveform of the unit backlight clock signal and a specific manner in which the unit backlight clock signal drives the backlight plate to emit light. For example, as shown in FIG. 2, each of the unit backlight clock signals may include at least one fourth pulse. Each fourth pulse corresponds to a unit backlight time. That is, each fourth pulse can be triggered in the corresponding unit light-emitting time to form a repeating unit with the corresponding backlight duty cycle.

Specifically, for the unit backlight clock signal corresponding to the third pulse not cut off in the second pulse corresponding to the next frame image in the first backlight synchronization signal, when a number of the fourth pulse is 1, the unit backlight time is equal to the display setting period. That is, a repeating unit can be formed with the corresponding backlight duty cycle to occupy the corresponding display setting period. It is ensured that the corresponding unit backlight clock signal can drive the backlight plate to continue or emit light according to a certain rule within the duration of the corresponding unit backlight clock signal. When the number of the fourth pulses is greater than that, the display setting period may include multiple unit backlight times. A plurality of repeating units can be formed with the corresponding backlight duty cycle to occupy the corresponding display setting period. It is ensured that the corresponding unit backlight clock signal can drive the backlight plate to continue or emit light according to a certain rule within the duration of the corresponding unit backlight clock signal.

It should be noted that, in conjunction with the step S3022, for the unit backlight clock signal corresponding to the third pulse not cut off in the second pulse corresponding to the next frame image in the first backlight synchronization signal, no matter the number of the fourth pulses is 1 or greater than 1, at least one repeating unit formed with the corresponding backlight duty cycle is also cut off in the second pulse corresponding to the next frame image in the first backlight synchronization signal. It prevents the corresponding sub-backlight modulation signal from exceeding the next frame image to reduce a risk of loss or even loss of the next frame image.

In an embodiment, the step of acquiring the backlight duty cycle of each frame image may include but is not limited to following steps.

S3031, a data signal of the frame image to be displayed is acquired, and the plurality of backlight duty cycles are generated according to the data signal of the frame image to be displayed. The data signal is configured to control a brightness of the frame image to be displayed.

Specifically, the backlight duty cycle of each frame image can be related to the corresponding data signal. Since the data signal is configured to control the brightness of the frame image to be displayed, the data signal can represent the brightness required by the corresponding frame image. According to the above discussion, the larger the backlight duty cycle, the greater the brightness required for a corresponding frame image, and the greater the brightness finally presented. That is, in this embodiment, the data signal is used to determine the corresponding backlight duty cycle, which can increase the similarity between the presented brightness and the required brightness of the corresponding frame image, and further improve the quality of the display image of the display panel.

As shown in Table 1, it can be understood as a brightness of a sub-pixel or all sub-pixels in grayscale values 255 and 127. The brightness of three methods of a DC dimming, a PWM dimming of the present disclosure, and a conventional PWM dimming are compared. The above data is based on a refresh rate of the sub-pixels in the plurality of frame images in a range of 48 Hz to 165 Hz. "Panel brightness" and "panel flicker" can be understood as a measurement of the brightness and a degree of flicker of the image presented by the display panel. "Backlight flicker" can be understood as a measurement of a degree of flicker that appears when multiple light sources of the backlight plate emit light. It is understandable that based on a "backlight flicker" parameter, a parameter of the "panel flicker" is less than (−40) dB, which can be considered as almost invisible flicker, and parameters of the "backlight flicker" and the "panel flicker" at (−10) dB can be considered as serious flicker.

TABLE 1

|  | DC dimming | PWM dimming of the present disclosure | conventional PWM dimming |
|---|---|---|---|
| panel brightness (255) | 900 nit | 900 nit | 900 nit |
| backlight flicker (255) | −88 dB | −81 dB | — |
| panel flicker (127) | −33.28 dB | −32.7 dB | −10 dB |

Specifically, as shown in Table 1, when a grayscale value is 255, a parameter of the "backlight flicker" in the PWM dimming method of the present disclosure is similar to a parameter of the "backlight flicker" in the DC dimming method. The flicker of both is small, and a parameter of the "backlight flicker" in the conventional PWM dimming method cannot be measured due to excessive flicker. When a grayscale value is 127, a parameter of the "panel flicker" in the PWM dimming method of the present disclosure is similar to a parameter of the "panel flicker" in the DC dimming method. A parameter of the "panel flicker" in the conventional PWM dimming method is (−10) dB, and the flicker is quite serious. In summary, the PWM dimming method of the present disclosure can effectively improve the flicker of the display image of the display panel.

An embodiment of the present disclosure provides a display panel, and the display panel includes but is not limited to following embodiments and a combination of the following embodiments.

Figure 4:
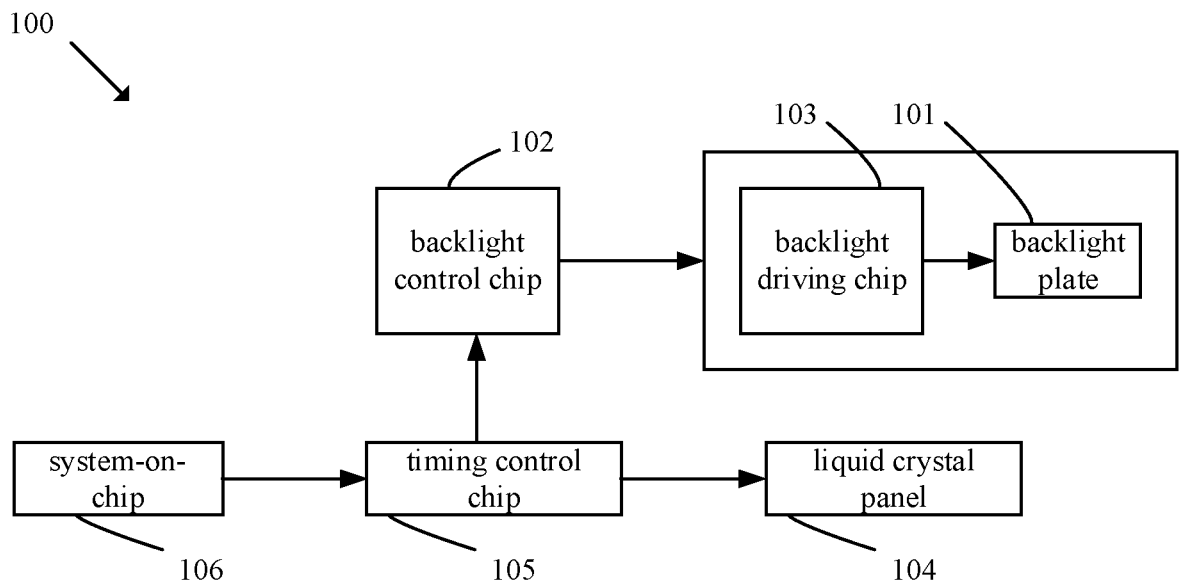
FIG. 4 is a structural block diagram of a display panel of an embodiment of the present disclosure.
Figure 5:
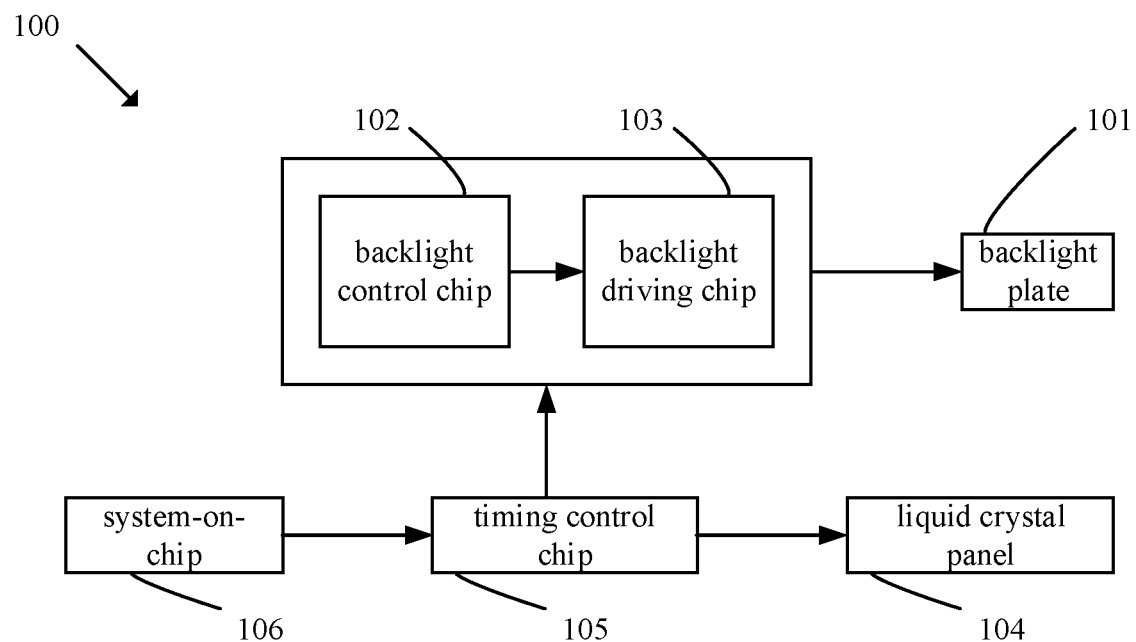
FIG. 5 is a structural block diagram of another display panel of an embodiment of the present disclosure.

In one embodiment, as shown in FIG. 4 and FIG. 5, the display panel 100 includes a backlight plate 101 for emitting light, a backlight control chip 102 electrically connected to the backlight plate 101, and a backlight driving chip 103. The backlight control chip 102 is configured to acquire a display synchronization signal and a display setting frequency of the display panel. The display synchronization signal includes a plurality of first pulses, each of the first pulses is configured to trigger a display of a corresponding frame image, and the display setting frequency is at least greater than a minimum value of refresh rates of a plurality of frame images in the display panel. The backlight driving chip 103 is configured to determine a first backlight synchronization signal of a backlight plate in the display panel according to the display synchronization signal. The first backlight synchronization signal includes a plurality of second pulses, the plurality of second pulses correspond to the plurality of first pulses in a one-to-one correspondence. A unit backlight clock signal of the backlight plate in the display panel is determined according to the display setting frequency. A duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal. The backlight driving chip 103 is further configured to generate at least one third pulse between some two adjacent second pulses in the first backlight synchronization signal, so that the first backlight synchronization signal is converted into a second backlight synchronization signal. Each of the second pulses triggers a generation of one of the unit backlight clock signals, and each of the third pulses triggers a generation of one of the unit backlight clock signals. As shown in FIG. 5, the backlight control chip 102 is integrated in the backlight driving chip 103. Alternatively, as shown in FIG. 4, the backlight control chip 102 and the backlight driving chip 103 are arranged separately.

For the related functions of the backlight control chip 102 and the backlight driving chip 103, refer to the relevant discussion on the driving method of the display panel above. Further, in combination with the above discussion, as shown in FIG. 4 and FIG. 5, the backlight control chip 102 can transmit the display synchronization signal and the display setting frequency to the backlight driving chip 103. The backlight driving chip 103 may generate a second backlight signal according to the display setting frequency, and transmit a corresponding backlight modulation signal generated from the second backlight signal to the backlight plate 101 to drive the backlight plate 101 to emit light. Specifically, the integration method of the backlight control chip 102 and the backlight driving chip 103 is not limited in this embodiment, and it only needs to satisfy that the signal transmission and signal processing described above can be realized between the backlight control chip 102 and the backlight driving chip 103.

In one embodiment, as shown in FIG. 4 and FIG. 5, the backlight control chip 102 is configured to acquire a refresh rate of a frame image to be displayed of the display panel 100, and determine whether the refresh rate of the frame image to be displayed of the display panel 100 is less than the display setting frequency. In response to the refresh rate of the frame image to be displayed being less than the display setting frequency, the backlight control chip 103 is configured to generate the third pulse every interval of the display setting period from one of the second pulses corresponding to the frame image to be displayed in the first backlight synchronization signal, until one of the second pulses corresponding to a next frame image in the first backlight synchronization signal is generated. Regarding how the backlight control chip 102 generates the third pulse according to the size relationship between the refresh rate of the frame image to be displayed of the display panel 100 and the display setting frequency, reference may be made to the relevant descriptions of the steps S301 and S302 above. In combination with the above discussion, the backlight control chip 102 can input the size relationship between the refresh rate of the frame image to be displayed of the display panel 100 and the display setting frequency to the backlight driving chip 103. Furthermore, the backlight driving chip 103 can generate at least one third pulse accordingly to form a second backlight clock signal.

In one embodiment, as shown in FIG. 5, the backlight control chip 102 is integrated in the backlight driving chip 103, and the backlight plate 101 and the backlight driving chip 103 are separately arranged. Alternatively, as shown in FIG. 4, the backlight control chip 102 and the backlight driving chip 103 are arranged separately, and the backlight driving chip 103 is integrated in the backlight plate 101. It is understandable that, compared with the structure of FIG. 4, the backlight control chip 102 of FIG. 3 is integrated into the backlight driving chip 103 to make the data transmission and exchange rate between the two higher. Compared with the structure of FIG. 3, the backlight driving chip 103 of FIG. 4 is integrated in the backlight plate 101, so that the data transmission rate of the backlight driving chip 103 to the backlight plate 101 is higher.

In an embodiment, as shown in FIG. 4 and FIG. 5, the display panel 100 further includes: a liquid crystal panel 104 and a timing control chip 105. The liquid crystal panel 104 is disposed on a light-emitting side of the backlight plate 101. The timing control chip 105 is electrically connected to the backlight control chip 102, the backlight driving chip 103, and the liquid crystal panel 104. The timing control chip 105 is configured to transmit the display setting frequency and the display synchronization signal to at least one of the backlight control chip 102 and the backlight driving chip 103 to drive the backlight plate 101 to emit light, and is configured to transmit a scanning data signal and a displaying data signal to the liquid crystal panel 104 to drive deflections of liquid crystal molecules in a liquid crystal.

Specifically, as shown in FIG. 5, the backlight control chip 102 is integrated in the backlight driving chip 103. The timing control chip 105 can transmit the display setting frequency and the display synchronization signal to the backlight control chip 102 or the backlight driving chip 103. As shown in FIG. 4, the backlight control chip 102 and the backlight driving chip 103 are separately arranged. The timing control chip 105 can transmit the display setting frequency and the display synchronization signal to the backlight control chip 102. Furthermore, the backlight driving chip 103 can generate a second backlight signal according to the display setting frequency, and generate a corresponding backlight modulation signal according to the second backlight signal and input it to the backlight plate 101 to drive the backlight plate 101 to emit light. Specifically, the timing control chip 105 can transmit a scanning data signal to a gate driving circuit in the liquid crystal panel 104 and a displaying data signal to a source driving circuit in the liquid crystal panel 104. Furthermore, the gate driving circuit processes the scanning data signal to form a plurality of gate signals. Each gate signal is loaded into the corresponding multiple sub-pixels. The source driving circuit processes the displaying data signal to form a plurality of data signals. Each data signal is loaded into the corresponding sub-pixel.

Furthermore, as shown in FIG. 4 and FIG. 5, the display panel 100 may also include a system-on-chip 106 electrically connected to the timing control chip 105. The system-on-chip 106 can send an image input protocol and an image signal to the timing control chip 105, so that the timing control chip 105 processes the image signal according to the image input protocol to form, including but not limited to, the display setting frequency, the display synchronization signal, the scanning data signal, and the displaying data signal.

The present disclosure provides the display panel and the driving method thereof. The driving method of the display panel includes: acquiring a display synchronization signal and a display setting frequency of the display panel, wherein the display synchronization signal includes a plurality of first pulses, each of the first pulses is configured to trigger a display of a corresponding frame image, and the display setting frequency is at least greater than a minimum value of refresh rates of a plurality of frame images in the display panel; determining a first backlight synchronization signal of a backlight plate in the display panel according to the display synchronization signal, wherein the first backlight synchronization signal includes a plurality of second pulses, the plurality of second pulses correspond to the plurality of first pulses in a one-to-one correspondence; and determining a unit backlight clock signal of the backlight plate in the display panel according to the display setting frequency, wherein a duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal; and generating at least one third pulse between some two adjacent second pulses in the first backlight synchronization signal, so that the first backlight synchronization signal is converted into a second backlight synchronization signal; and triggering a generation of one of the unit backlight clock signals by each of the second pulses, and triggering a generation of one of the unit backlight clock signals by each of the third pulses. In this solution, at least one third pulse is generated between some two adjacent second pulses in the first backlight synchronization signal to form the second backlight synchronization signal, such that after a frame image with a smaller refresh rate exceeds a time of an image refreshed with the display setting frequency, it can still be generated by triggering at least one corresponding unit backlight clock signal by at least one of the third pulses in the second backlight synchronization signal, so as to drive the backlight plate to still emit light. It prevents the backlight plate from turning off in advance during a process of presenting the frame image with the smaller refresh rate, thereby preventing the dark state and improving a quality of a display image of an LCD panel.

What is claimed is:

1. A driving method of a display panel, comprising:
acquiring a display synchronization signal and a display setting frequency of the display panel, wherein the display synchronization signal comprises a plurality of first pulses, each of the first pulses is configured to trigger a display of a corresponding frame image, and the display setting frequency is at least greater than a minimum value of refresh rates of a plurality of frame images in the display panel;
determining a first backlight synchronization signal of a backlight plate in the display panel according to the display synchronization signal, wherein the first backlight synchronization signal comprises a plurality of second pulses, the plurality of second pulses correspond to the plurality of first pulses in a one-to-one correspondence; and determining a unit backlight clock signal of the backlight plate in the display panel according to the display setting frequency, wherein a duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal; and
generating at least one third pulse between some two adjacent second pulses in the first backlight synchronization signal, so that the first backlight synchronization signal is converted into a second backlight synchronization signal; and triggering a generation of one of the unit backlight clock signals by each of the second pulses, and triggering a generation of one of the unit backlight clock signals by each of the third pulses;
wherein when a refresh rate of a frame image to be displayed is less than the display setting frequency, the step of generating the third pulse comprises:
acquiring a first to-be-measured interval between a current third pulse generated after an interval of the display setting period and the second pulse corresponding to the next frame image in the first backlight synchronization signal; and
if the first to-be-measured interval is less than the display setting period, cutting off the unit backlight clock signal corresponding to the current third pulse generated after the interval of the display setting period when or before the second pulse corresponding to the next frame image in the first backlight synchronization signal is generated;
wherein the step of triggering the generation of the unit backlight clock signal by the second pulses and the third pulse comprises:
triggering the generation of a plurality of the unit backlight clock signals to form a backlight clock signal according to at least one of the second pulses and at least one of the second pulses in the second backlight synchronization signal, and acquiring a backlight duty cycle of each frame image; and
generating a backlight modulation signal according to the backlight clock signal and a plurality of the backlight duty cycles, and driving the backlight plate to emit light in the plurality of frame images by the backlight modulation signal.

2. The driving method of the display panel according to claim 1, wherein the step of generating at least one third pulse between two adjacent second pulses in the first backlight synchronization signal, so that the first backlight synchronization signal is converted into the second backlight synchronization signal comprises:
acquiring a refresh rate of a frame image to be displayed of the display panel, and determining whether the refresh rate of the frame image to be displayed of the display panel is less than the display setting frequency; and
if the refresh rate of the frame image to be displayed is less than the display setting frequency, from one of the second pulses corresponding to the frame image to be displayed in the first backlight synchronization signal, generating the third pulse every interval of the display setting period until one of the second pulses corresponding to a next frame image in the first backlight synchronization signal is generated.

3. The driving method of the display panel according to claim 2, wherein the display setting frequency is greater than or equal to the refresh rate of any frame image in the display panel.

4. The driving method of the display panel according to claim 1, wherein the step of from one of the second pulses corresponding to the frame image to be displayed in the first backlight synchronization signal, generating the third pulse every interval of the display setting period until one of the second pulses corresponding to the next frame image in the first backlight synchronization signal is generated comprises:
- acquiring a second to-be-measured interval between one of the second pulses corresponding to the frame image to be displayed and one of the second pulses corresponding to the next frame image;
- generating a corresponding number of the third pulses according to the second to-be-measured interval, wherein the unit backlight clock signal corresponding to the third pulse closest to the second pulse of the next frame image is cut off when or before the second pulse corresponding to the next frame image in the first backlight synchronization signal is generated.

5. The driving method of the display panel according to claim 1, wherein the step of acquiring the backlight duty cycle of each frame image comprises:
- acquiring a data signal of the frame image to be displayed, and generating the plurality of backlight duty cycles according to the data signal of the frame image to be displayed, wherein the data signal is configured to control a brightness of the frame image to be displayed.

6. A driving method of a display panel, comprising:
- acquiring a display synchronization signal and a display setting frequency of the display panel, wherein the display synchronization signal comprises a plurality of first pulses, each of the first pulses is configured to trigger a display of a corresponding frame image, and the display setting frequency is at least greater than a minimum value of refresh rates of a plurality of frame images in the display panel;
- determining a first backlight synchronization signal of a backlight plate in the display panel according to the display synchronization signal, wherein the first backlight synchronization signal comprises a plurality of second pulses, the plurality of second pulses correspond to the plurality of first pulses in a one-to-one correspondence; and determining a unit backlight clock signal of the backlight plate in the display panel according to the display setting frequency, wherein a duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal; and
- generating at least one third pulse between some two adjacent second pulses in the first backlight synchronization signal, so that the first backlight synchronization signal is converted into a second backlight synchronization signal; and triggering a generation of one of the unit backlight clock signals by each of the second pulses, and triggering a generation of one of the unit backlight clock signals by each of the third pulses.

7. The driving method of the display panel according to claim 6, wherein the step of generating at least one third pulse between two adjacent second pulses in the first backlight synchronization signal, so that the first backlight synchronization signal is converted into the second backlight synchronization signal comprises:
- acquiring a refresh rate of a frame image to be displayed of the display panel, and determining whether the refresh rate of the frame image to be displayed of the display panel is less than the display setting frequency; and
- if the refresh rate of the frame image to be displayed is less than the display setting frequency, from one of the second pulses corresponding to the frame image to be displayed in the first backlight synchronization signal, generating the third pulse every interval of the display setting period until one of the second pulses corresponding to a next frame image in the first backlight synchronization signal is generated.

8. The driving method of the display panel according to claim 7, wherein the display setting frequency is greater than or equal to the refresh rate of any frame image in the display panel.

9. The driving method of the display panel according to claim 7, wherein the step of from one of the second pulses corresponding to the frame image to be displayed in the first backlight synchronization signal, generating the third pulse every interval of the display setting period until one of the second pulses corresponding to the next frame image in the first backlight synchronization signal is generated comprises:
- acquiring a first to-be-measured interval between a current third pulse generated after an interval of the display setting period and the second pulse corresponding to the next frame image in the first backlight synchronization signal; and
- if the first to-be-measured interval is less than the display setting period, cutting off the unit backlight clock signal corresponding to the current third pulse generated after the interval of the display setting period when or before the second pulse corresponding to the next frame image in the first backlight synchronization signal is generated.

10. The driving method of the display panel according to claim 7, wherein the step of from one of the second pulses corresponding to the frame image to be displayed in the first backlight synchronization signal, generating the third pulse every interval of the display setting period until one of the second pulses corresponding to the next frame image in the first backlight synchronization signal is generated comprises:
- acquiring a second to-be-measured interval between one of the second pulses corresponding to the frame image to be displayed and one of the second pulses corresponding to the next frame image;
- generating a corresponding number of the third pulses according to the second to-be-measured interval, wherein the unit backlight clock signal corresponding to the third pulse closest to the second pulse of the next frame image is cut off when or before the second pulse corresponding to the next frame image in the first backlight synchronization signal is generated.

11. The driving method of the display panel according to claim 7, wherein the steps of triggering a generation of one of the unit backlight clock signals by each of the second pulses, and triggering a generation of one of the unit backlight clock signals by each of the third pulses comprise:
- triggering the generation of a plurality of the unit backlight clock signals to form a backlight clock signal according to at least one of the second pulses and at least one of the second pulses in the second backlight synchronization signal, and acquiring a backlight duty cycle of each frame image; and
- generating a backlight modulation signal according to the backlight clock signal and a plurality of the backlight duty cycles, and driving the backlight plate to emit light in the plurality of frame images by the backlight modulation signal.

12. The driving method of the display panel according to claim 11, wherein the step of acquiring the backlight duty cycle of each frame image comprises:
acquiring a data signal of the frame image to be displayed, and generating the plurality of backlight duty cycles according to the data signal of the frame image to be displayed, wherein the data signal is configured to control a brightness of the frame image to be displayed.

13. A display panel, comprising: a backlight plate configured to emit light, a backlight control chip electrically connected to the backlight plate, and a backlight driving chip;
wherein the backlight control chip is configured to acquire a display synchronization signal and a display setting frequency of the display panel, wherein the display synchronization signal comprises a plurality of first pulses, each of the first pulses is configured to trigger a display of a corresponding frame image, and the display setting frequency is at least greater than a minimum value of refresh rates of a plurality of frame images in the display panel;
wherein the backlight driving chip is configured to determine a first backlight synchronization signal of a backlight plate in the display panel according to the display synchronization signal, wherein the first backlight synchronization signal comprises a plurality of second pulses, the plurality of second pulses correspond to the plurality of first pulses in a one-to-one correspondence; and determine a unit backlight clock signal of the backlight plate in the display panel according to the display setting frequency, wherein a duration of the unit backlight clock signal is equal to a display setting period, the display setting period is a reciprocal of the display setting frequency, each of the second pulses is configured to trigger a generation of the unit backlight clock signal, and each of the unit backlight clock signals is configured to drive the backlight plate to emit light within the duration of the corresponding unit backlight clock signal;
wherein the backlight driving chip is further configured to generate at least one third pulse between some two adjacent second pulses in the first backlight synchronization signal, so that the first backlight synchronization signal is converted into a second backlight synchronization signal; and trigger a generation of one of the unit backlight clock signals by each of the second pulses, and trigger a generation of one of the unit backlight clock signals by each of the third pulses; and
wherein the backlight control chip is integrated in the backlight driving chip, or the backlight control chip and the backlight driving chip are arranged separately.

14. The display panel according to claim 13, wherein the backlight control chip is configured to acquire a refresh rate of a frame image to be displayed of the display panel, and determine whether the refresh rate of the frame image to be displayed of the display panel is less than the display setting frequency; and
in response to the refresh rate of the frame image to be displayed being less than the display setting frequency, the backlight control chip is configured to generate the third pulse every interval of the display setting period from one of the second pulses corresponding to the frame image to be displayed in the first backlight synchronization signal, until one of the second pulses corresponding to a next frame image in the first backlight synchronization signal is generated.

15. The display panel according to claim 13, wherein the backlight control chip is configured to acquire a first to-be-measured interval between a current third pulse generated after an interval of the display setting period and the second pulse corresponding to the next frame image in the first backlight synchronization signal; and
if the first to-be-measured interval is less than the display setting period, the backlight control chip is configured to cut off the unit backlight clock signal corresponding to the current third pulse generated after the interval of the display setting period when or before the second pulse corresponding to the next frame image in the first backlight synchronization signal is generated.

16. The display panel according to claim 13, wherein the backlight control chip is configured to acquire a second to-be-measured interval between one of the second pulses corresponding to the frame image to be displayed and one of the second pulses corresponding to the next frame image;
the backlight control chip is configured to generate a corresponding number of the third pulses according to the second to-be-measured interval, wherein the unit backlight clock signal corresponding to the third pulse closest to the second pulse of the next frame image is cut off when or before the second pulse corresponding to the next frame image in the first backlight synchronization signal is generated.

17. The display panel according to claim 13, wherein the backlight control chip is configured to trigger the generation of a plurality of the unit backlight clock signals to form a backlight clock signal according to at least one of the second pulses and at least one of the second pulses in the second backlight synchronization signal, and acquire a backlight duty cycle of each frame image; and
the backlight control chip is configured to generate a backlight modulation signal according to the backlight clock signal and a plurality of the backlight duty cycles, and drive the backlight plate to emit light in the plurality of frame images by the backlight modulation signal.

18. The display panel according to claim 17, wherein the backlight control chip is configured to acquire a data signal of the frame image to be displayed, and generate the plurality of backlight duty cycles according to the data signal of the frame image to be displayed, wherein the data signal is configured to control a brightness of the frame image to be displayed.

19. The display panel according to claim 13, wherein the backlight control chip is integrated in the backlight driving chip, and the backlight plate and the backlight driving chip are separately arranged; or
the backlight control chip and the backlight driving chip are separately arranged, and the backlight driving chip is integrated in the backlight plate.

20. The display panel according to claim 13, further comprising:
a liquid crystal panel disposed on a light-emitting side of the backlight plate;
a timing control chip electrically connected to the backlight control chip, the backlight driving chip, and the liquid crystal panel, wherein the timing control chip is configured to transmit the display setting frequency and the display synchronization signal to at least one of the backlight control chip and the backlight driving chip to drive the backlight plate to emit light, and is configured to transmit a scanning data signal and a displaying data signal to the liquid crystal panel to drive deflections of liquid crystal molecules in a liquid crystal.

* * * * *